US009923870B2

(12) United States Patent
Dusi et al.

(10) Patent No.: US 9,923,870 B2
(45) Date of Patent: Mar. 20, 2018

(54) METHOD AND SYSTEM FOR ANALYZING A DATA FLOW

(71) Applicant: NEC EUROPE LTD., Heidelberg (DE)

(72) Inventors: Maurizio Dusi, Gadesco Pieve Delmona (IT); Saverio Niccolini, Neckargemuend (DE); Giulio Picierro, Velletri (IT); Riccardo Paolillo, Rome (IT); Michele Orru, Lunamatrona (IT); Giuseppe Bianchi, Rome (IT)

(73) Assignee: NEC CORPORATION, Tokyo (JP)

( * ) Notice: Subject to any disclaimer, the term of this patent is extended or adjusted under 35 U.S.C. 154(b) by 30 days.

(21) Appl. No.: 14/912,094

(22) PCT Filed: Dec. 12, 2013

(86) PCT No.: PCT/EP2013/076433
§ 371 (c)(1),
(2) Date: Feb. 15, 2016

(87) PCT Pub. No.: WO2015/086082
PCT Pub. Date: Jun. 18, 2015

(65) Prior Publication Data
US 2016/0205072 A1 Jul. 14, 2016

(51) Int. Cl.
*H04L 29/06* (2006.01)
*G06F 17/30* (2006.01)
(Continued)

(52) U.S. Cl.
CPC .... *H04L 63/0263* (2013.01); *G06F 17/30699* (2013.01); *G06N 7/005* (2013.01);
(Continued)

(58) Field of Classification Search
USPC .......... 726/13, 2, 21, 36; 713/150, 163, 180; 380/255, 264, 276
See application file for complete search history.

(56) References Cited

U.S. PATENT DOCUMENTS 7,633,944 B1 * 12/2009 Chang ................... H04L 43/028
370/389
7,742,406 B1 * 6/2010 Muppala ............. H04L 41/5022
370/230
(Continued)

FOREIGN PATENT DOCUMENTS

GB 2425025 A 10/2006
WO WO 2013032473 A1 3/2013

*Primary Examiner* — Farid Homayounmehr
*Assistant Examiner* — Sharif E Ullah
(74) *Attorney, Agent, or Firm* — Leydig, Voit & Mayer, Ltd.

(57) ABSTRACT

A method for analyzing a data flow includes extracting packet information of a packet of the data flow, determining the status of the packet and the status of the data flow based on the extracted packet information and storing the packet for later inspection when the status of the packet and/or the status of the data flow indicate that the packet is out-of sequence, and inspecting the packet and/or the stored packet based on inspection rules. Upon a partial match of at least one of the inspection rules with the extracted packet information, a result of the inspection of the packet is temporarily stored. Already stored packets are inspected when they are in-order with already inspected packets. Upon a total match of at least one of the inspection rules, a predetermined action is performed and the stored result is deleted.

18 Claims, 5 Drawing Sheets

(51) Int. Cl.
*G06N 7/00* (2006.01)
*H04L 12/26* (2006.01)
(52) U.S. Cl.
CPC ........ *H04L 43/028* (2013.01); *H04L 63/0245* (2013.01); *H04L 63/0254* (2013.01); *H04L 63/145* (2013.01)

(56) References Cited

U.S. PATENT DOCUMENTS

| | | | | |
|---|---|---|---|---|
| 2006/0077979 | A1* | 4/2006 | Dubrovsky | H04L 47/34 370/394 |
| 2006/0203804 | A1* | 9/2006 | Whitmore | H04L 12/5692 370/352 |
| 2007/0011734 | A1* | 1/2007 | Balakrishnan | H04L 43/026 726/13 |
| 2008/0077688 | A1* | 3/2008 | Ahrndt | H04L 65/605 709/224 |
| 2008/0201772 | A1* | 8/2008 | Mondaeev | H04L 63/1408 726/13 |
| 2008/0307524 | A1* | 12/2008 | Singh | G06F 21/55 726/22 |
| 2010/0095367 | A1* | 4/2010 | Narayanaswamy | H04L 63/0245 726/12 |
| 2011/0099631 | A1* | 4/2011 | Willebeek-LeMair | H04L 43/028 726/23 |
| 2012/0240185 | A1* | 9/2012 | Kapoor | H04L 63/1425 726/1 |

* cited by examiner

METHOD AND SYSTEM FOR ANALYZING A DATA FLOW

CROSS REFERENCE TO RELATED APPLICATIONS

This application is a U.S. National Stage Application under 35 U.S.C. § 371 of International Application No. PCT/EP2013/076433, filed on Dec. 12, 2013. The International Application was published in English on Jun. 18, 2015 as WO 2015/086082 A1 under PCT Article 21(2).

FIELD

The present invention relates to a method for analyzing a data flow, and further relates to a system for analyzing a data flow.

BACKGROUND

Although applicable to any analyzation method, the present invention will be described with regard to deep packet inspection and deep flow inspection.

In general deep packet inspection enables analysis of an application layer content of a data packet, for example a packet transmitted via TCP/IP, to detect whether it contains patterns taken from a signature data base such as content strings, regular expressions or snort-type modifiers or the like.

However when a pattern spans over multiple packets within the same flow—such an example is shown in FIG. 1—an analysis of the content of one packet may not match the full expression.

To overcome this problem conventionally the entire flow is reconstructed by reassembling consecutive packets so that they are in-order and then a deep packet inspection on the reconstructed stream is applied and it is looked for matches in the entire flow which is also known under the term "deep flow inspection" DFI.

However one of the disadvantages is, that an application on large traffic volumes is infeasible since each flow has to be reconstructed in total prior to an inspection: A flow reconstruction chain, for example a thread in software implementations, for every flow crossing the link is required, thus draining computational resources.

Another disadvantage is, that when reassembling the flow, a state per each flow being reconstructed has to be explicitly maintained, thus draining memory resources. Those per-flow resources are reserved for the entire life time of the flow even if it experiences some inactivity within its lifetime. For example in the non-patent literature of A. Kortebi, L. Muscariello, S. Oueslati, J. Roberts, "Evaluating the number of active flows in a scheduler realizing fair statistical bandwidth sharing," ACM SIGMETRICS 2005 or in the non-patent literature of C. Hu, Y. Tang, X. Chen, and B. Liu, "Per-flow Queueing by Dynamic Queue Sharing," Proceedings of IEEE INFOCOM, Anchorage, Ak., 2007 it is shown that the number of flows exhibiting packet level activity during a given time window, between hundred of milliseconds up to some seconds, is significantly smaller than the number of flows which are in progress. This means that if a high speed link shares a total number of one million flows in practice, the number of active ones at a given time is in the order of some thousands, therefore a lot of memory is used for flows which are inactive.

Further in the non-patent literature of "Beyond bloom filters: from approximate membership checks to approximate state machines (SIGCOMM06)", George Varghese et al., http://cseweb.ucsd.edu/~varghese/PAPERS/sigcomm06a.pdf\, D-left tables for traffic analysis are shown, however, flow-state information is saved and insert/delete operations are used to update the status of a flow.

In the non-patent literature of "Bouma2-A Quasi-Stateless, Tunable Multiple String-Match Algorithm", http://arxiv.org/abs/1209.4554, a quasi-stateless string matching algorithm is shown.

SUMMARY

In an embodiment, the present invention provides a method for analyzing a data flow, including a) extracting packet information of a packet of the data flow, b) determining the status of the packet and the status of the data flow based on the extracted packet information and storing the packet for later inspection when the status of the packet and/or the status of the data flow indicate that the packet is out-of sequence, and c) inspecting the packet and/or the stored packet based on inspection rules. Upon a partial match of at least one of the inspection rules with the extracted packet information, a result of the inspection of the packet is temporarily stored. Already stored packets are inspected when they are in-order with already inspected packets. Upon a total match of at least one of the inspection rules, a predetermined action is performed and the stored result is deleted.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
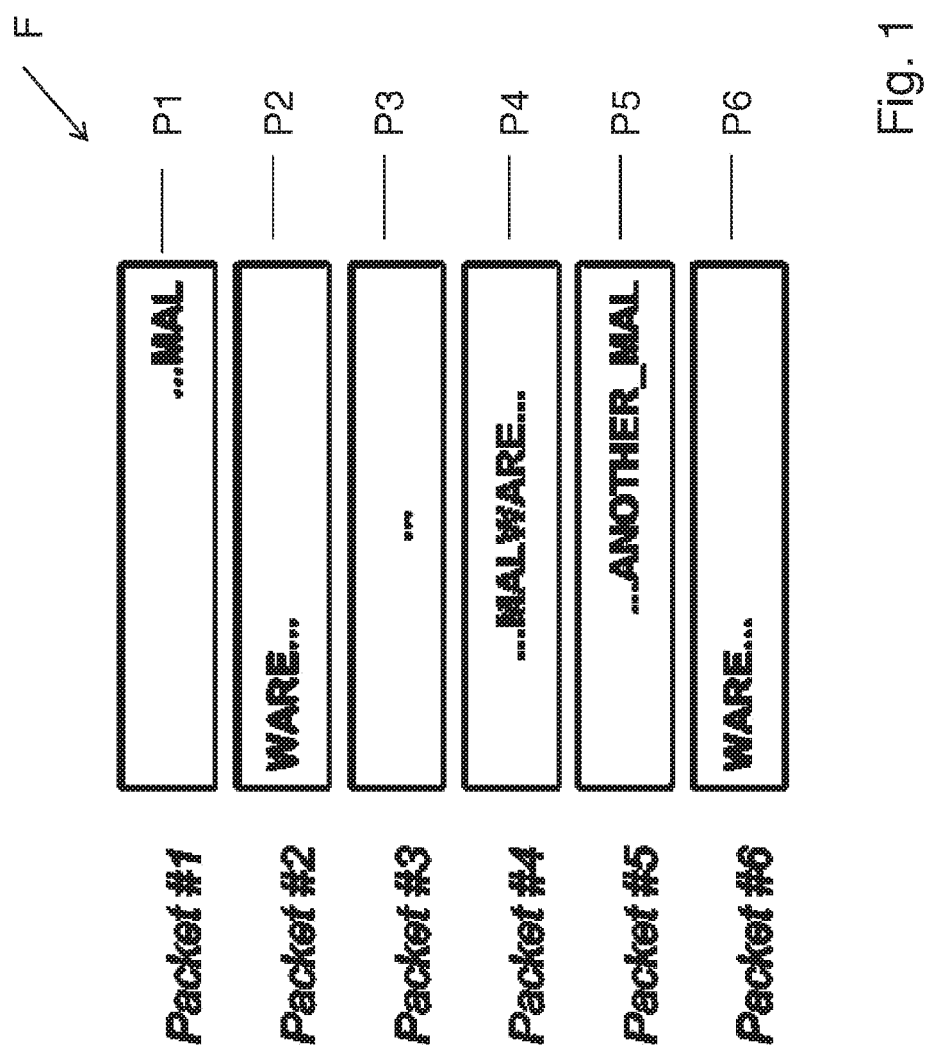
FIG. 1 depicts an example of patterns in a flow.

According to an embodiment, the present invention provides a method and system for analyzing a data flow being more efficient in terms of computational resources.

According to an embodiment, the present invention provides a method and a system for analyzing a data flow which are efficient in terms of memory usage/memory resources.

According to an embodiment, the present invention provides a method and a system for analyzing a data flow which do not require a reconstruction for each flow or keeping state information for each flow.

According to an embodiment, the present invention provides a method and a system for analyzing a data flow which enable that a larger number of flows compared to conventional methods and systems can be analyzed.

According to an embodiment, a method for analyzing a data flow is defined. The method is characterized by the steps of:
a) Extracting packet information of a packet of the data flow,
b) Determining the status of said packet and the status of said data flow based on the extracted packet information, and storing it for later inspection when the status indicates that said packet is out-of sequence, and
c) Inspecting said packet and/or the stored packet based on inspection rules wherein upon a partial match of at least one of the inspection rules with the extracted packet information the result of the packet inspection of said packet is temporarily stored, and wherein already stored packets are inspected when they are in-order with already inspected packets and wherein upon a total match of at least one of the inspection rules a predetermined action is performed and the stored result is deleted.

According to an embodiment, a system for analyzing a data flow is defined. The system is characterized by:
Extraction means operable to extract packet information of a packet of the data flow,
Status means operable to determine the status of said packet and the status of said data flow based on the extracted packet information,
Storing means operable to store said packet for later inspection when the status indicates that said packet is out-of sequence, and by
Inspecting means operable to inspect said packet and/or the stored packet based on inspection rules wherein upon a partial match of at least one of the inspection rules with the extracted packet information the result of the packet inspection of said packet is temporarily stored, and wherein already stored packets are inspected when they are in-order with already inspected packets and wherein upon a total match of at least one of the inspection rules a predetermined action is performed and the stored result is deleted.

According to an embodiment of the invention, the memory footprint when inspecting packets can be reduced: since upon a partial match the result of the packet inspection is temporarily stored and packets are inspected when they are in order with already inspected packets, it is not required to save each packet of the flow for a later reconstruction.

According to an embodiment of the invention, on-the-fly inspection of a data flow is enabled. Consecutive packets within the same flow allow a per-flow inspection without prior reassembling the flow.

According to an embodiment of the invention, it is not required to keeping a state for every flow under analysis.

According to an embodiment of the invention, only a state has to be kept for each flow with regard to the corresponding sequence of packets, for example the sequence number.

According to an embodiment of the invention, a packet and/or flow inspection is performed as soon as packets belonging to the flow are received.

According to an embodiment of the invention, an easy and cost effective implementation is enabled.

In an embodiment of the invention, flow information is only stored when required. Relevant information is stored only for flows for which out-of-sequence packets or for which only a partial match occurred upon inspection occur. For the majority of data flows to be analyzed packets are analyzed on-the-fly and are and have not to be stored for a later analysis.

According to a preferred embodiment for determining the status according to step b) it is checked b1) whether said packet is related to an already received packet based on the extracted information and if not, setting the status of the packet as out-of-sequence and b2) whether said packet matches to an already observed flow based on the extracted information. This enables in a fast and efficient way to determine the status of a packet, in particular if the packet belongs to an already observed flow and if the packet is related to an already received packet for example in terms of a consecutive packet.

According to a further preferred embodiment for determining the status of a packet at last one probabilistic filter, preferably a pair of Bloom-filters is applied on this packet. This enables to keep flow-state information compact. For example in case of a pair of rotating Bloom-filters enable a look up of the state of the flow to which the packet belongs. If the packet is in-order then said packet is inspected for example by deep packet inspection. To detect out-of-order and/or duplicated packets in particular the pair of rotating Bloom-filters is used to store the number of the next consecutive packet for each flow: For example when a packet arrives at the pair of Bloom-filters a set of keys is extracted and checked against the Bloom-filters such that the presence or the absence of the key in the Bloom-filters indicates positional information of the current packet within the flow it belongs to.

According to a further preferred embodiment step c) includes performing of a deep packet inspection. This enables to perform a so-called streaming deep packet inspection by using the small amount of information, i.e. each packet is inspected without having a TCP flow reconstruction.

According to a further preferred embodiment in step c) upon no match the packet is dropped. This ensures that memory usage for temporarily storing packets or status can be kept low since upon no match there is no need to save the packet for a later use and the packet is dropped.

According to a further preferred embodiment duplicate packets are determined in step b), preferably in step b2) and dropped before step c). This enables in a very efficient way to identify duplicate packets within the flow, for example caused by a retransmission due to packet loss or the like. Upon detection of a duplicate packet it can be dropped, since the packet has already been analyzed: In case of a partial match the status of the corresponding packet was temporarily saved, in case of no match the packet was simply dropped. Therefore the duplicate packet is also of no interest and in case of a total match the action has already be performed and therefore performing the same action again is not necessary anymore.

According to a further preferred embodiment a timeout is used for stored status information and/or for a stored out-of-sequence packet, wherein after a predetermined time the information and/or the stored packets are dropped. This handles the following case in a very efficient way: In case of packets sent by a sender, for example a video stream and the sender somehow terminates the transmission, for example due to a power failure at the location of the sender, there will be no further transmission of the video stream. Therefore by using a timeout, unnecessary storing of status information or out-of-order packets for a long time is avoided and therefore memory usage is efficiently reduced.

According to a further preferred embodiment the status of a packet is defined as position of the packet within the flow. This provides that memory to be used for temporarily storing the status can be kept very low. Preferably positional information of the packet within the flow may be provided in form of a packet sequence number.

According to a further preferred embodiment the status of the flow is defined as a binary variable indicating an observation of the flow prior to said packet. This enables to classify if the packet belongs to an already observed flow or if the packet belongs to a new flow. In case the packet belongs to a new flow then for example in case of the Bloom-filters these are updated to include this information for next packets arriving at the Bloom-filters.

According to a further preferred embodiment for storing packet and/or status information a 2-left hash table extension is used. This enables in an easy way to store information about the flow state and eventually store out-of-sequence packets in order to resume the inspection when packets are received in between, so that packets composing a flow are then in order. By using a D-left hash table this may act as a dictionary with key-value pairs taking as key for example the five tuple indicating IP source, IP destination, port source, port destination and L4-protocol and as a value a pair formed by the current state for the given flow and a queue of out-of-sequence packets ordered by a sequence number.

According to a further preferred embodiment the size of the probabilistic filters is determined based on a probability smaller or equal to a predetermined threshold. This enhances flexibility as well as optimizing memory usage. For example in case of Bloom-filters the size of the Bloom-filters can be adapted to guarantee that the probability for false positives, i.e. for instance Bloom-filters, return that a member or element is in the table of the Bloom-filters even if it is not is below a threshold. For example to avoid such a collision, the memory for the Bloom-filters can be enlarged and the probability for such a collision is then reduced.

According to a further preferred embodiment in case of non-deterministic results of a probabilistic filter, the provided result when applying the probabilistic filter on a packet is based on the non-deterministic result having the highest probability. This ensures that unlikely results of probabilistic filters are not considered. Of course a separate probability analysis may be performed so that ambiguity problems can be recognized and in that case handled separately.

FIG. 1 shows an example of patterns in a flow. In FIG. 1 a plurality of packets P1, P2, P3, P4, P5, P6 in a flow F are shown. These packets P1, P2, P3, P4, P5, and P6 are sequentially ordered.

In FIG. 1, for example, the regular expression "MAL-WARE" is to be found by deep packet inspection in the flow F. However the term "MAL" belongs to packet P1 and the term "WARE" belongs to packet P2. Therefore conventionally both packets P1, P2 are to be stored, if applicable reordered and the corresponding flow F has to be reconstructed in general, so that they are in order. Then a deep packet inspection can be performed on the entire flow, i.e. performing a deep flow inspection DFI for the corresponding regular expression "MALWARE".

Figure 2:
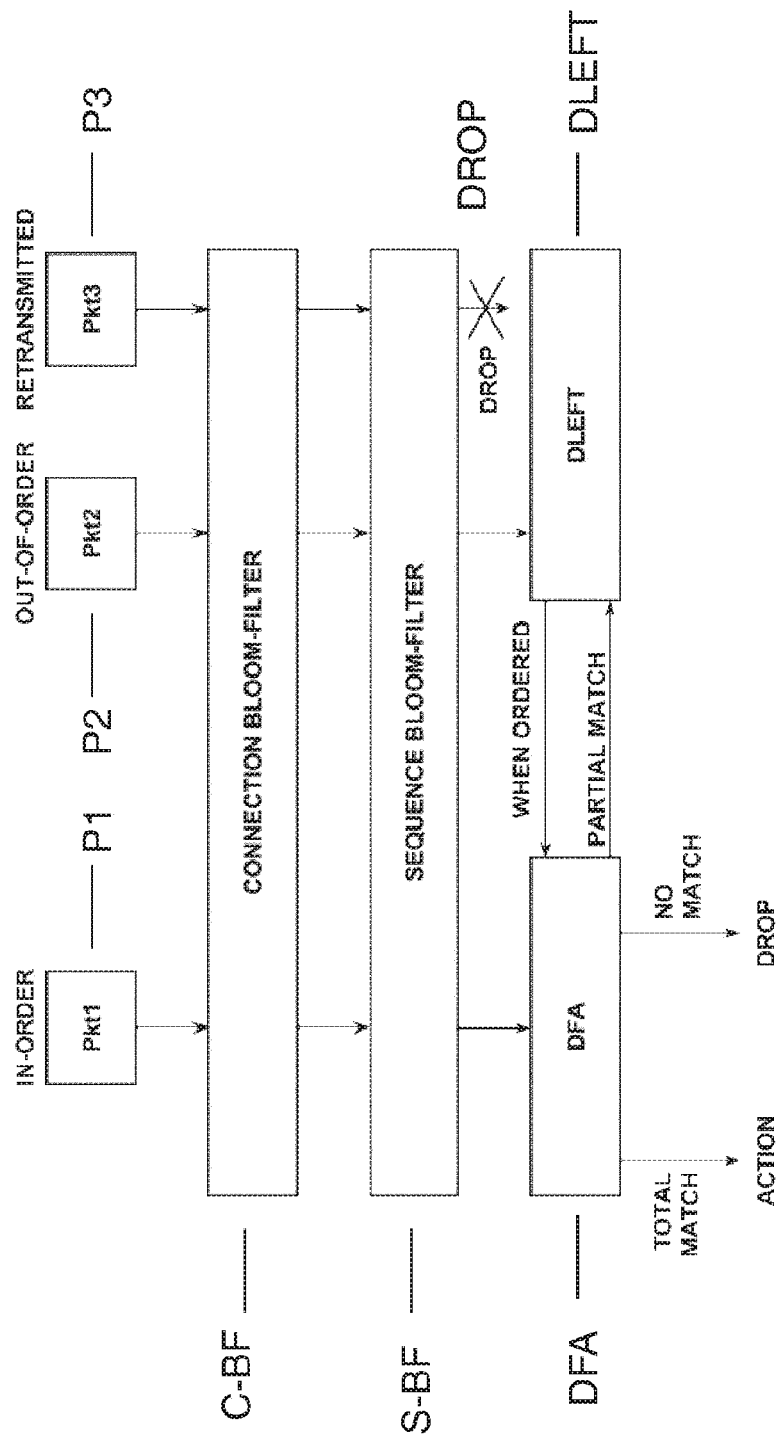
FIG. 2 depicts a flow chart of a method according to a first embodiment of the present invention.

FIG. 2 shows a flow chart of a method according to a first embodiment of the present invention. In FIG. 2 packets P1, P2, P3 are shown, wherein the first packet P1 is a so-called in-order packet, the second packet P2 is an out-of-order packet and the third packet P3 is a retransmitted packet. All packets P1, P2, P3 enter a so-called connection Bloom-filter C-BF. The connection Bloom-filter C-BF holds information about the packets, for example five tuples including source and destination IP-addresses and corresponding ports as well as a L4-protocol entry that have been seen to far: In this way it can be distinguished whether it is the first time that a given connection represented by information included in the 5-tuple and extracted from the corresponding packet information of the packets P1, P2, P3—is observed.

A re-transmitted packet, i.e. the packet P3 in FIG. 2 is identified by the sequence Bloom-filter S-BF and this packet is dropped. The other two packets P1, P2 after passing the connection Bloom-filter C-BF enter then the sequence Bloom-filter S-BF. The sequence Bloom-filter S-BF holds information for example about the expected TCP connection sequence numbers. Upon arrival of the packet P1, P2, the 5-tuple and the current sequence number of the packet P1, P2 within the corresponding flow F will be concatenated and looked for in the sequence Bloom-filter S-BF.

If there is no match, i.e. the sequence Bloom-filter S-BF returns that a key, i.e. information of the 5-tuple is not in the table, the packet P2 is determined to be out-of-order, or packet P2 is the first packet of the corresponding TCP session. When a match in the sequence Bloom-filter S-BF occurs, this means that either the packet P3 is a duplicate, for example the packet P3 has the same pair of five-tuple and corresponding sequence number or it is an in-order, not already inspected packet P1. In case of a match the sequence Bloom-filter S-BF is updated respectively its corresponding table with the entry related to the <5-tuple, next sequence number> key.

In case of a match to solve the ambiguity of the keys <5-tuple, current sequence number> and <5-tuple next sequence number> can be checked: If they are both present in the sequence Bloom-filter S-BF this packet P3 is considered as duplicate. If only <5-tuple, current sequence number> is present then the packet P1 can be considered in-order.

The overhead due to the connection Bloom-filter C-BF can be reduced by looking up in it only when both of the keys <5-tuple, current sequence number> and <5-tuple, next sequence number> are not present in the sequence Bloom-filter S-BF.

Below a list of possibilities when a packet coming into the Bloom-filters is shown:

| SEQUENCE BF | | | |
|---|---|---|---|
| <5-tuple, CurSeqno> | <5-tuple, NextSeqno> | CONNECTION BF <5-tuple> | Meaning |
| Absent | absent | absent | First packet |
| Absent | absent | present | Out-of-order packet |
| Present | absent | present | In-sequence packet |
| Present | present | present | Duplicate packet |

The connection Bloom-filter C-BF and the sequence Bloom-filter S-BF lead to an identification of the flow F and whether the current packet is new, in-order, out-of-order or duplicate within the flow F. After the status ST of the packet and the flow F is determined then deep flow inspection may be performed to look for a match over the corresponding packet. For example a regular expression engine may take an input regular expression, for example using a PCRE-like syntax, built deterministic finite automata DFA to look for patterns in the packet and then the engine is run over the network packets/payload to check for a partial or total match. The regular expressions and the deterministic finite automata DFA may be defined at the configuration time of the system 1 whereas match checking occurs at run-time.

The deep packet inspection engine thus performs inspection on-the-fly, i.e. flow inspection is performed as soon as packets belonging to the flow are received. Flow analysis is performed as soon as the next in-order packet of that flow has entered the system 1 and after the inspection it is discarded. As long as in-order packets are received, packets are not stored even if a partial match or no match with that packet is determined.

Thus, every time a packet is analyzed belong to a given flow in case the partial match occurs between two consecutive network packets the deterministic finite automata DFA state is temporarily stored that this reached after inspecting the current packet, so the inspection can be resumed once the next in-order packet is received. The pair of Bloom-filters, i.e. the connection Bloom-filter C-BF and the sequence Bloom-filter S-BF enable that packets within the same flow are delivered in-order to the deep packet inspection engine.

The type of the deep packet inspection engine is not limited: For example it may be Thompson deep packet inspection engine which converts a regular expression to non-deterministic finite automata NFA and then convert it to a deterministic finite automata (DFA). Other deep packet inspection engines may be used.

The Bloom-filters are in particular probabilistic data structures which may return false positives. This means that for instance Bloom-filters may return that a packet corresponds to an entry in the Bloom-filter even if it is not. However, this collision has limited impact:

- The size of the Bloom-filters can be tuned to guarantee a given probability p that such collision happens.
- Since in the sequence Bloom-filter S-BF two keys are checked and in the connection Bloom-filter C-BF one key is checked the probability of a collision is even lower: Assuming independence between both Bloom-filters S-BF and C-BF and assuming that both Bloom-filters S-BF, C-BF are of equal size then such a probability of collision is $p^3$ or $p^2$ if the look up in the connection Bloom-filter C-BF is not performed.
- Ambiguities can be eliminated if both Bloom-filters S-BF and C-BF are used: In the following table the list of ambiguities and how can they can be handled are shown:

|   | SEQUENCE_BF | | CONNECTION_BF | Meaning | | |
|---|---|---|---|---|---|---|
| # | CurSeqno | NextSeqno | <5-tuple> | Low probability | High probability | Det/Prob |
| -1- | 0 | — | 0 | | First Packet | Deterministic |
| -2- | 0 | — | 1 | First Packet | Out of Order | Probabilistic |
| -3- | 1 | 0 | 0 | | First Packet | Deterministic |
| -4- | 1 | 0 | 1 | Out of order | In Order | Probabilistic |
| -5- | 1 | 1 | 0 | | First Packet | Deterministic |
| -6- | 1 | 1 | 1 | In Order | Duplicate | Probabilistic |

In the left column the numbers -1-, -3- and -5- correspond to the cases in which the sequence Bloom-filter S-BF may return false positives. For example a query results in a "1", i.e. the element is present in the corresponding table of the sequence Bloom-filter S-BF even if it is not. However, in all these cases the "0", i.e. which means the element is not present, response from querying the connection Bloom-filter C-BF clearly eliminates the ambiguity: The Bloom-filters S-BF, C-BF never return false negatives.

The case number -2- corresponds to the case where the connection Bloom-filter C-BF returns that the element is in the table of the connection Bloom-filter C-BF but the current sequence number is not in the sequence Bloom-filter S-BF. This is most likely the case of an out-of-order packet but assuming that with low probability, which is configurable as mentioned above, the connection Bloom-filter C-BF is returning a false positive, this packet could be interpreted as the first packet of the flow corresponding to the situation as in case -1-. Either way the packet can be considered as out-of-order, even if it is the first one and can be cached in the D-left table DLEFT together with the packets received after it: Once the timeout expires the flow inspection will start in the available in-order packets anyway.

The case number -4- corresponds to the case where the connection Bloom-filter C-BF returns that the element is in the table of the connection Bloom-filter C-BF and the current sequence number is in the sequence Bloom-filter S-BF but not the expected next sequence number. This is most likely the case of in-order packets but assuming that with low probability the sequence Bloom-filter S-BF is returning a false positive as for current sequence number this packet could be interpreted as an out-of-order packet corresponding to the situation as in case -2-. The presence of the inspected sequence number being stored in the D-left table DLEFT enables distinguishing between the two cases.

The case number -6- corresponds to the case where the connection Bloom-filter C-BF returns that the element is in the table of the connection Bloom-filter C-BF and both the current sequence number and the inspected sequence number are in the sequence Bloom-filter S-BF. This is most likely the case of a duplicate packet but assuming that with low probability the sequence Bloom-filter S-BF is returning a false positive as for the expected sequence number this packet could be interpreted as an in-order packet corresponding to the situation as in case -4-. The presence of the inspected sequence number with is stored in the D-left hash table DLEFT enables distinguishing between the two cases. Alternatively the duplicate packets can be analyzed and an alert can be triggered not only in case a total match occurs but also in case of a partial match. The case of "no match" does not present a problem.

Further the case in which both the connection Bloom-filter C-BF and the sequence Bloom-filter S-BF in the current sequence number return false positives is very unlikely and is preferably not considered.

Figure 3A:
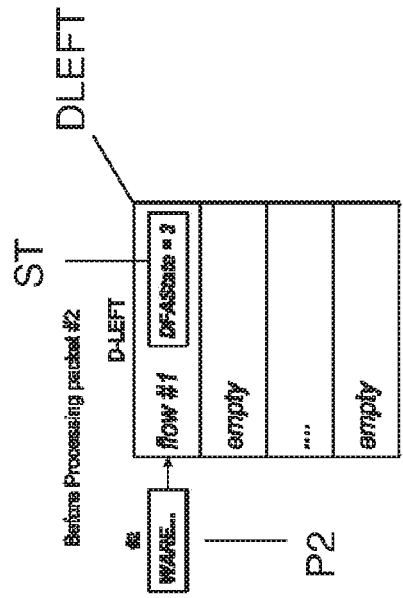
FIGS. 3a, 3b depict certain steps of a method according to a second embodiment of the present invention.
Figure 3B:
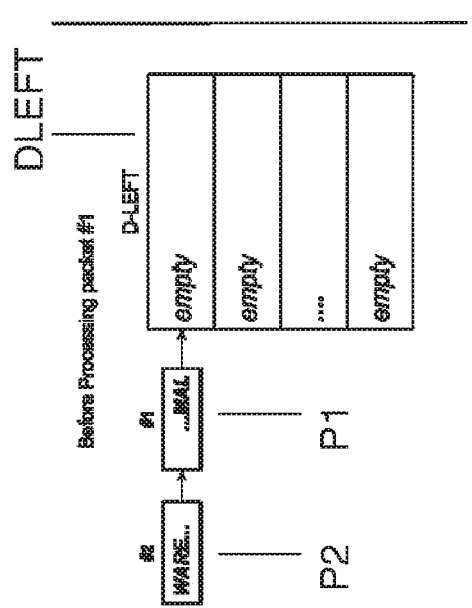

FIG. 3*a*, 3*b* show part of steps of a method according to a second embodiment of the present invention. In FIGS. 3*a* and 3*b* an opportunistic allocation of a state in a D-left structure DLEFT when a partial match is determined is shown. For example when the received packet is out-of-order or the deep packet inspection engine returns a partial match then a D-left hash table DLEFT is used to store information about the deterministic finite automata DFA state and eventually store out-of-sequence packets in order to resume the inspection when packets are received in between so that packets composing the flow are in order. This D-left table DELFT acts as a dictionary with key-value pairs and takes as key preferably the 5-tuple and as value a pair formed by the current state of the deterministic finite automata DFA for the given flow F and a queue of out-or-sequence packets ordered by a sequence number.

In FIG. 3a the D-left table DLEFT is empty in the beginning. When a first packet P1 arrives and it is not a duplicate one the first packet P1 may be determined to be in-order or out-of order. In case of an in-order packet the deterministic finite automata DFA state is retrieved from the D-left table DLEFT and the inspection is resumed from the last partial match. If the entry comprises previously received out-of-order packets they are processed as well, given that they are now in-order with the last received packet triggering the deep packet inspection.

In FIG. 3a there is no entry in the D-left hash table DELFT since the packet P1 is the first packet to arrive. In FIG. 3a, 3b two packets P1 and P2 are sequentially processed. After processing the first packet P1 the DFA state ST of the first packet P1 is stored in the D-left table DLEFT and the number of the flow is correspondingly stored in the D-left table DLEFT associated with the DFA state ST of the first packet P1. This is shown in FIG. 3b. Then the second packet P2 is processed. The second packet P2 is checked whether it is not a duplicate one. Then the second packet P2 is checked whether it is in-order or out-of-order. Since the second packet P2 is in-order the first packet P1 was the previous packet—the deterministic finite automata DFA state of the first packet P1 is retrieved from the D-left table DLEFT and the inspection of the second packet P2 is resumed from the last partial match according to the retrieved DFA state. After processing the second packet P2 the DFA state ST of the second packet P2 is stored in the D-left table DLEFT and the number of the flow is correspondingly stored in the D-left table DLEFT associated with the DFA state ST of the second packet P2 and so on.

Figures 4A, 4B:
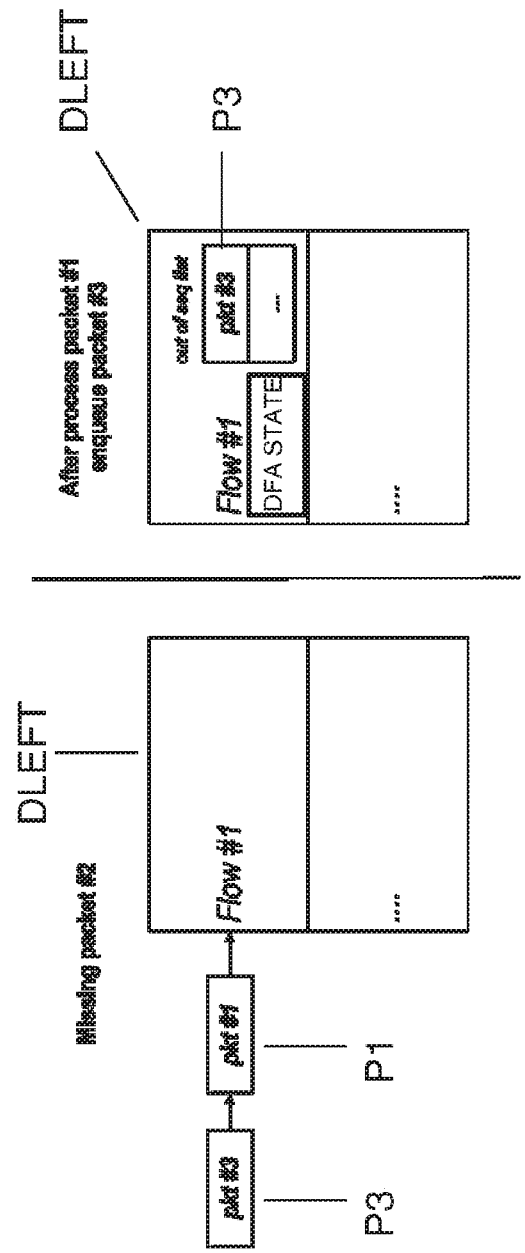
FIGS. 4a, 4b depict certain steps of a method according to a third embodiment of the present invention.

FIGS. 4a, 4b show part of the steps of a method according to a third embodiment of the present invention. In FIGS. 4a, 4b processing of an out-of-order packet is shown. FIG. 4a corresponds to FIG. 3a. However in FIG. 4a a second packet P2 is missing and instead a third packet P3 follows directly the first packet P1. Therefore the third packet P3 will be determined as an out-of-order packet. Therefore when an out-of-order packet arrives, for example in FIG. 4a this packet P3 since packet P2 is missing, in the D-left table DLEFT according to FIG. 4b the DFA state of first packet P1 being in-order is stored, the corresponding flow number for the first packet P1 is stored as well as the third packet P3 is stored in the buffer queue according to its sequence number. No matching in done in this case. A new entry in the D-left table DLEFT for the DFA state of the first packet P1 if it does not exist is created and the third packet P3 is stored in the buffer queue according to its sequence number, preferably in a sorted list for out-of-order/out-of-sequence packets.

Figure 5:
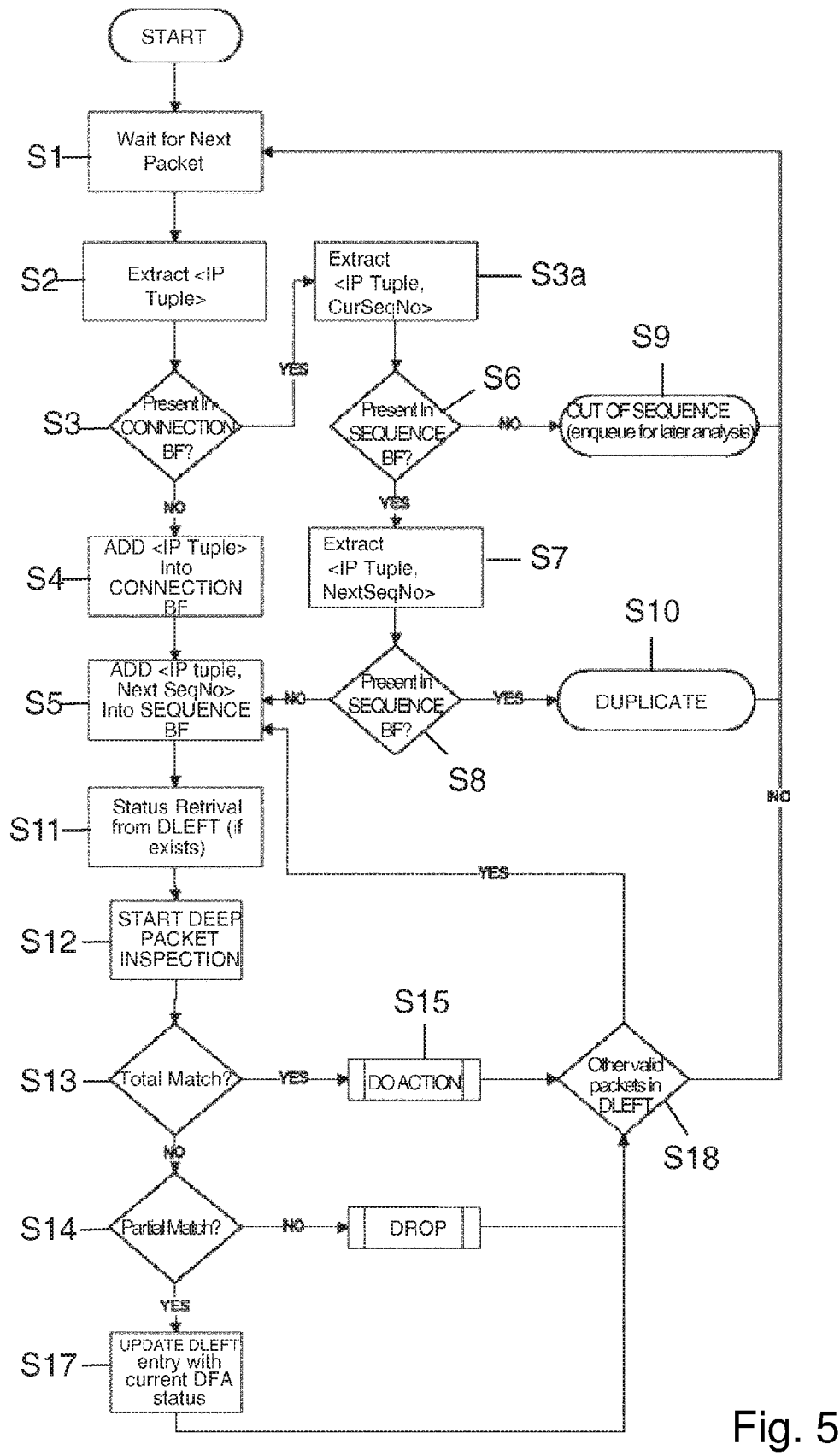
FIG. 5 depicts a flow chart of a method according to a fourth embodiment of the present invention.

FIG. 5 shows a flow chart of a method according to a fourth embodiment of the present invention. After starting, in a first step S1 it is waited for a next packet. In a second step S2 the IP-tuple of the arrived packed is extracted, wherein IP-tuple includes source and destination IP-addresses and ports. In a third step S3 it is checked whether the arrived packet is present in the connection Bloom-filter C-BF. If not then in a fourth step S4 the information of the IP-tuple is added to the connection Bloom-filter C-BF. Then in a fifth step S5 the IP-tuple with the next sequence number and the IP-tuple is added to the sequence Bloom-filter S-BF.

If in the third step S3 the arrived packet is determined to be present in the connection Bloom-filter C-BF a 5-tuple <IP-tuple, current sequence number>, wherein the sequence number indicates the position of the packet within the flow, is extracted. In a sixth step S6 it is checked if it is present in the sequence Bloom-filter S-BF. If yes then in a seventh step S7 the IP-tuple together with the next sequence number is extracted from the packet. Then it is checked if the next sequence number is present in the sequence Bloom-filter S-BF in an eighth step S8 and if not then it is proceeded with in the fifth step S5 by adding the next sequence number to the sequence Bloom-filter S-BF.

If in the sixth step S6 the packet is not present in the sequence Bloom-filter S-BF in an ninth step S9 it is determined that the packet is out-of-sequence and it is in queued for later analysis and it is then waited for the next packet again starting with step S1.

If in the eighth step S8 the next sequence number is present in the sequence Bloom-filter S-BF then it is determined in a tenth step S10 that a duplicate packet is present and this duplicate packet is dropped and it is waited for the next packet starting again with the first step S1.

After performing the fifth step S5 in an eleventh step S11 the status is retrieved from the D-left hash table DLEFT if the status exists for that packet. In a twelfth step S12 the deep packet inspection DPI is started and in a thirteenth step S13 it is checked for a total match and in case of a total match an action is performed in a fifteenth step S15. If in step S13 there is no total match it is checked in a fourteenth step S14 if a partial match is present. If not then in a sixteenth step S16 the packet is dropped. If a partial match is determined in the fourteenth step S14 then in a seventeenth step S17 the D-left entry with the current deterministic finite automata DFA state is updated.

After step 15, 16 or 17 it is checked in an eighteenth step S18 if another valid packet is present in the D-left hash table DLEFT. If yes then the fifth step S5 is performed and if no it is waited for the next packet starting with step S1 again.

In summary, an embodiment of the present invention provides in particular deep packet inspection while re-ordering of the flow without reconstructing the flow. The present invention enables a deep packet inspection per-packet analysis that stores flow information only when required. In particular only relevant information is kept only for flows for which out-of-order packets are received or for which only a partial match occurred while performing deep packet analysis. The present invention enables that for the majority of analyzed flows no entry is stored but only an entry of the corresponding state.

An embodiment of the present invention enables deep packet inspection without reconstructing the whole flow but only while re-ordering the flow. An embodiment of the present invention preferably uses a D-left hash table to store information about the state of the deep packet inspection analysis of the flow in terms of the state of the deterministic finite automata DFA and eventually the out-of-order packets. The present invention preferably uses probabilistic data structure and specific steps in a way to reduce computational power, memory consumption and still reducing ambiguities resulting from the use of probabilistic data structures.

An embodiment of the present invention preferably uses Bloom-filters to store minimal flow-state information including whether the flow has been seen before or whether or not the current packet is an in-order-packet with the flow. The present invention enables a combination of probabilistic data structures like Bloom-filters and a D-left hash table to perform opportunistic quasi-stateless deep flow inspection DFI.

An embodiment of the present invention enables to perform on-the-fly deep flow inspection, i.e. streaming analysis, which is efficient in terms of memory and computational resources being used. A further advantage is, that by using a bank of Bloom-filters flow-state information can be kept compact. A further advantage is, that when using a D-left hash table for storing information on a deep packet inspection analysis the D-left hash table is only used for flows for which a partial match was determined.

An embodiment of the present invention can better scale in terms of computational resources and memory consumption as opposed to conventional mechanisms. The present invention enables to inspect a much larger number of flows, in particular estimated being in a range of 2-3 orders of magnitude. Additionally the present invention is simple and flexible in terms of whatever automata work best and use this in its deep packet inspection engine.

To summarize, an embodiment of the present invention preferably uses a bank of Bloom-filters to keep compact state information for all flows within the aggregate of traffic such as whether or not the current packet is the next one in the flow in terms of actual sequence number. Then the next step is to immediately perform deep packet inspection analysis on a per-packet basis every time an in-order packet for a given flow is received. The deep packet inspection analysis may either process the packet and conclude that it is an already processed one so it is has rules to handle it or it can find a signature match or conclude that the analysis of the packet payload returns only a partial match and thus wait for the next packet to proceed with the inspection. In this last case or in case of out-of-order packets a D-left data structure is used to store the out-of-order packets or the current state of the deterministic finite automata DFA to resume the inspection upon receiving the next packet. In case of out-of-order packets or a partial match an explicit state for the flow under analysis is stored greatly reducing the memory needed to carry out deep packet inspection on large traffic links.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for analyzing a data flow, comprising:
   a) extracting packet information of a packet of the data flow,
   b) determining a status of the packet and a status of the data flow based on the extracted packet information and storing the packet for later inspection based on the status of the packet and the status of the data flow indicating that the packet is out-of sequence, and
   c) inspecting the packet and the stored packet based on inspection rules, wherein upon a partial match of at least one of the inspection rules with the extracted packet information, a result of the inspection of the packet is temporarily stored, wherein already stored packets are inspected based on the already stored packets being in-order with already inspected packets, and wherein upon a total match of at least one of the inspection rules, a predetermined action is performed and the stored result is deleted,
   wherein the determining a status of the packet comprises applying at least one probabilistic filter to the packet, and
   wherein for storing the packet and status information, a 2-Left hash table extension (DLEFT) is used.

2. The method according to claim 1, wherein the determining the status of the packet according to step b) comprises:
   b1) checking whether the packet is related to an already received packet based on the extracted packet information, and if not, setting the status for the packet as out-of-sequence, and
   b2) checking whether the packet matches an already observed flow based on the extracted packet information.

3. The method according to claim 1, wherein step c) includes performing a deep packet inspection (DPI).

4. The method according to claim 1, wherein step c) includes:
   upon no match of at least one of the inspection rules, dropping the packet.

5. The method according to claim 1, further comprising:
   determining, in step b), duplicate packets and dropping the duplicate packets before step c).

6. The method according to claim 1, wherein a timeout is used for stored status information and/or for a stored out-of-sequence packet, and
   wherein after a predetermined time the stored status information and/or the stored out-of-sequence packet is dropped.

7. The method according to claim 1, wherein the status of the packet is defined as a position of the packet within the flow.

8. The method according to claim 1, wherein the status of the flow is defined as a binary variable indicating an observation of the flow prior to the packet.

9. The method according to claim 1, wherein the size of the at least one probabilistic filter is determined based on a probability smaller or equal to a predetermined threshold.

10. The method according to claim 1, wherein in case of non-deterministic results of the at least one probabilistic filter, a provided result when applying the probabilistic filter on a packet is based on a non-deterministic result having the highest probability.

11. The method of claim 1, wherein the at least one probabilistic filter is a pair of Bloom-filters.

12. A system for analyzing a data flow, the system comprising:

one or more processors operable to:
extract packet information of a packet of the data flow,
determine a status of the packet and a status of the data flow based on the extracted packet information, and
memory operable to store the packet for later inspection based on the status of the packet and the status of the data flow indicating that the packet is out-of sequence,
wherein the one or more processors are further operable to inspect the packet and the stored packet based on inspection rules, wherein upon a partial match of at least one of the inspection rules with the extracted packet information the result of the packet inspection of the packet is temporarily stored, wherein already stored packets are inspected based on the already stored packets being in-order with already inspected packets, and wherein upon a total match of at least one of the inspection rules a predetermined action is performed and the stored result is deleted,
wherein the determining a status of the packet comprises applying at least one probabilistic filter to the packet, and
wherein for storing the packet and status information, a 2-Left hash table extension (DLEFT) is used.

13. The system according to claim 12, wherein the one or more processors are further operable to:
check whether the packet is related to an already received packet based on the extracted packet information, and if not, set the status for the packet as out-of-sequence, and
check whether the packet matches an already observed flow based on the extracted packet information.

14. The system according to claim 12, wherein the size of the at least one probabilistic filter is determined based on a probability smaller or equal to a predetermined threshold.

15. The system according to claim 12, wherein the one or more processors are further operable to perform a deep packet inspection (DPI).

16. The system according to claim 12, wherein upon no match of at least one of the inspection rules, the one or more processors are further operable to drop the packet.

17. The system according to claim 12, wherein the one or more processors are further operable to:
determine that a packet is duplicate, and in response to the packet being duplicate, drop the duplicate packet.

18. A method for analyzing a data flow, comprising:
a) extracting packet information of a packet of the data flow,
b) determining a status of the packet and a status of the data flow based on the extracted packet information and storing the packet for later inspection based on the status of the packet and the status of the data flow indicating that the packet is out-of sequence, and
c) inspecting the packet and the stored packet based on inspection rules, wherein upon a partial match of at least one of the inspection rules with the extracted packet information, a result of the inspection of the packet is temporarily stored, wherein already stored packets are inspected based on the already stored packets being in-order with already inspected packets, and
wherein upon a total match of at least one of the inspection rules, a predetermined action is performed and the stored result is deleted,
wherein the determining a status of the packet comprises applying at least one probabilistic filter to the packet, and
wherein in case of non-deterministic results of the at least one probabilistic filter, a provided result when applying the probabilistic filter on a packet is based on a non-deterministic result having the highest probability.

* * * * *